March 1, 1966     R. F. WUERKER ETAL     3,238,465
D.C. FOCUSED AND PUMPED PARAMETRIC AMPLIFIER
Filed Oct. 20, 1961     4 Sheets-Sheet 1
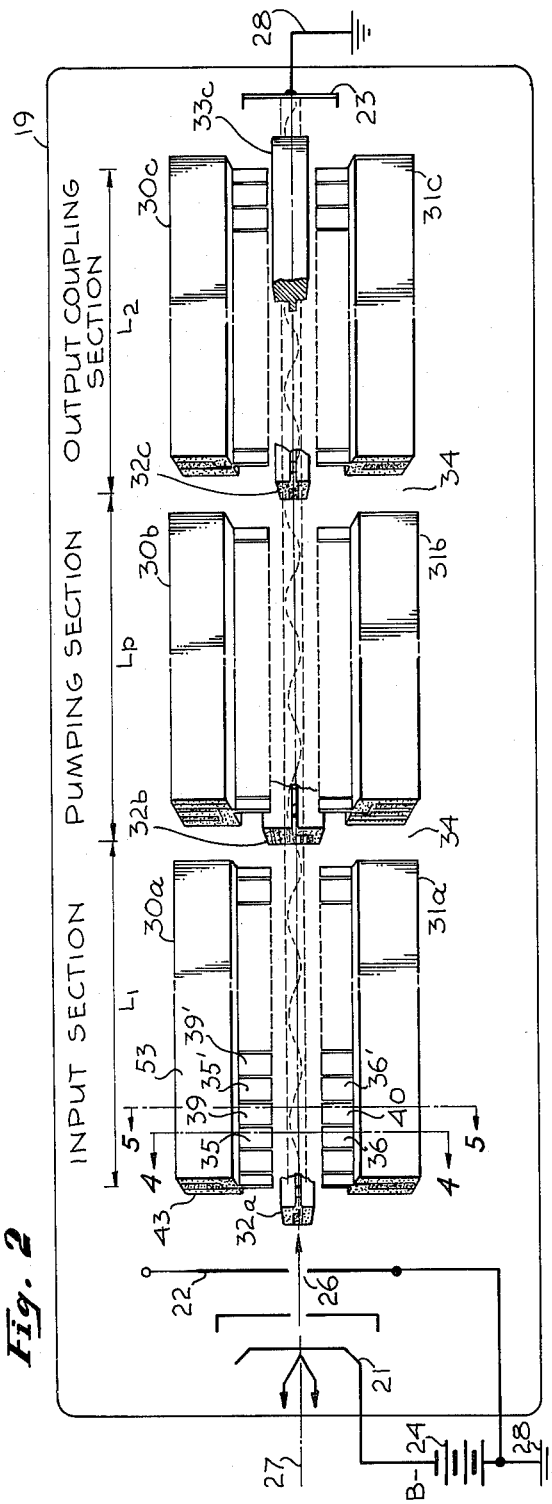
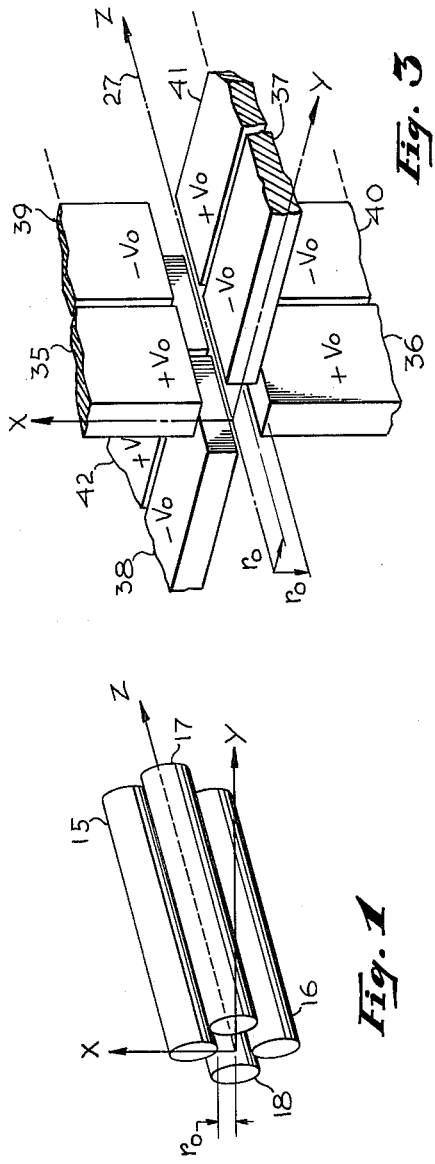
RALPH F. WUERKER
ROBERT V. LANGMUIR
INVENTORS
BY
*Benjamin DeWitt*
ATTORNEY March 1, 1966  R. F. WUERKER ETAL  3,238,465
D.C. FOCUSED AND PUMPED PARAMETRIC AMPLIFIER
Filed Oct. 20, 1961  4 Sheets-Sheet 2

RALPH F. WUERKER
ROBERT V. LANGMUIR
INVENTORS

BY
*Benjamin DeWitt*
ATTORNEY

March 1, 1966 R. F. WUERKER ETAL 3,238,465
D.C. FOCUSED AND PUMPED PARAMETRIC AMPLIFIER
Filed Oct. 20, 1961 4 Sheets-Sheet 3

RALPH F. WUERKER
ROBERT V. LANGMUIR
INVENTORS

BY
ATTORNEY

March 1, 1966 R. F. WUERKER ETAL 3,238,465
D.C. FOCUSED AND PUMPED PARAMETRIC AMPLIFIER
Filed Oct. 20, 1961 4 Sheets-Sheet 4
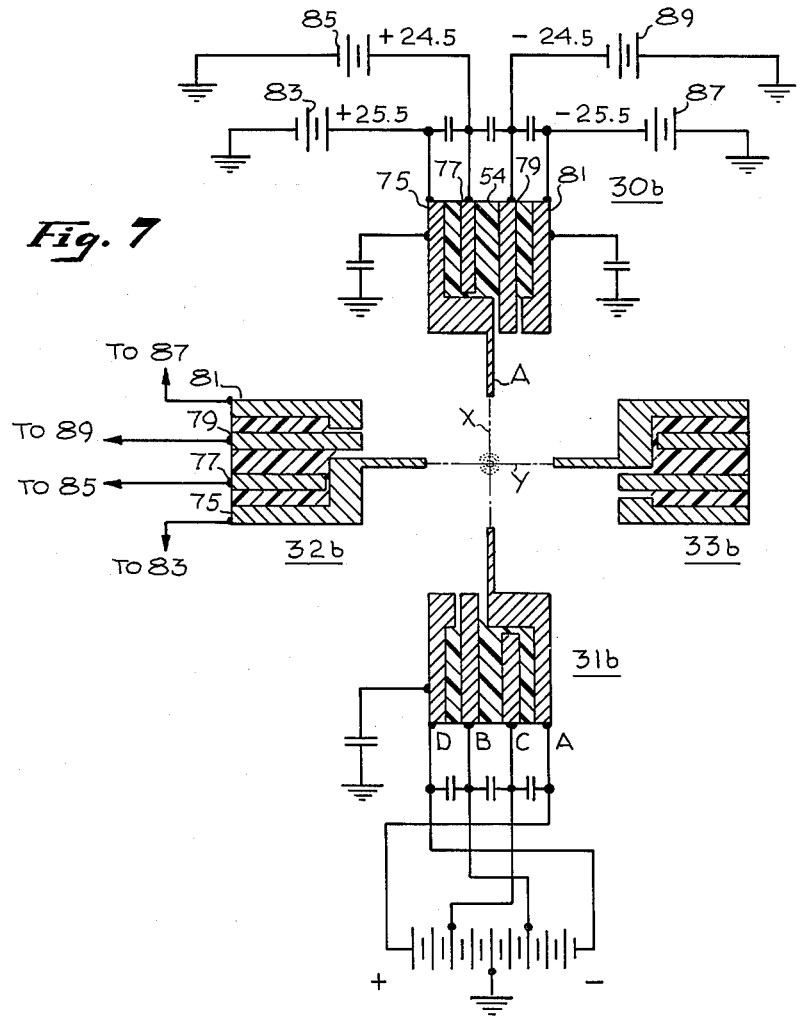
Fig. 7
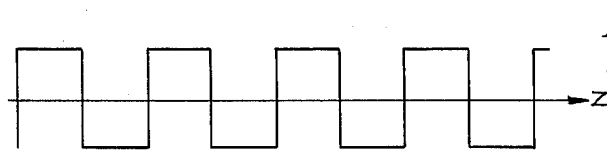
Fig. 11
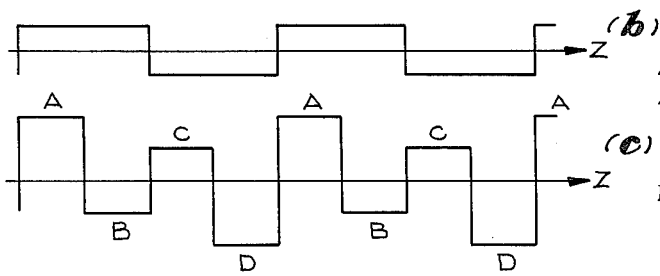
RALPH F. WUERKER
ROBERT V. LANGMUIR
INVENTORS
BY
Benjamin DeWitt
ATTORNEY United States Patent Office 3,238,465
Patented Mar. 1, 1966

3,238,465
D.C. FOCUSED AND PUMPED PARAMETRIC AMPLIFIER
Ralph F. Wuerker, Palos Verdes Estates, and Robert V. Langmuir, Altadena, Calif., assignors, by mesne assignments, to TRW Inc., a corporation of Ohio
Filed Oct. 20, 1961, Ser. No. 146,642
2 Claims. (Cl. 330—4.7)

The present invention relates to high frequency electric wave translating apparatus, and more particularly to electron beam discharge devices utilizing transverse oscillatory motion of beam electrons for translation, generation and/or amplification of ultra-high frequency signals.

In the prior art, techniques, sometimes called "strong focusing," have been developed for focusing a beam of charge-bearing particles, such as electrons, along a predetermined axis. One general class of such techniques utilizes magnetic fields which interact with the longitudinal velocity of the charged particles to provide an inward force acting on the charged particles. In the extremely small space occupied by a beam, it is impractical to have transverse magnetic fields which cause all particles to be continuously subjected to inward force. If the beam is focused in one plane, there exists another plane perpendicular thereto where it is defocused. Strong focusing systems overcome this problem by providing a succession of magnetic field regions along the beam path, with the fields in successive regions being oriented so that the beam is focused alternately in two mutually perpendicular planes. Systems which utilize that technique have the disadvantage of requiring large magnets or solenoids of extreme weight, cost, and bulk in order to provide good magnetic focusing.

More recently, it has been proposed that transverse alternating electric fields (as contrasted to magnetic fields) can be utilized to provide strong focusing in accordance with similar theoretical principles. For example, in our copending application, Serial No. 851,055, filed November 5, 1959, now U.S. Patent No. 3,147,445 and entitled "Transverse Beam Tube," we have described various electron beam tubes using quadrupole electrode structures which, in contrast to the above-mentioned magnetic systems, are energized by alternating voltage and provide alternating transverse electric fields along the electron beam path for electrodynamic strong focusing of the beam. The principles of strong focusing beam containment will not be described herein complete theoretical detail, since they are thoroughly treated in the literature, for example, our above-mentioned application Serial No. 851,055, and United States Patent No. 2,939,952, issued June 7, 1960, to Wolfgang Paul and Helmut Steinwedel.

Alternating voltage energized strong focusing systems as exemplified above, while being eminently satisfactory for some end uses, are not particularly attractive for ultra-high frequency and microwave signal generation or amplification because they inherently require alternating current focusing voltages having frequencies exceeding the signal frequencies to be amplified or generated.

Accordingly, it is a primary object of the present invention to provide an improved charged particle beam device suitable for low-noise operation in the ultra-high frequency and microwave frequency regions.

It is another object of our invention to provide an improved electron beam discharge device which is relatively small in size and low in weight, but nevertheless capable of substantial high frequency signal amplification.

It is a further object of our invention to provide an electron beam discharge device utilizing transverse oscillatory motion of beam electrons in which the beam is confined to a beam path of predetermined cross-sectional area without the use of collimating magnetic fields or high frequency voltages for beam focusing.

It is a still further object of our invention to provide a transversely oscillating charged particle beam device for oscillators or amplifiers which does not require input control voltage at frequencies higher than that of the signals to be generated or amplified.

It is an additional object of our invention to provide a quadrupole parametric amplifier which eliminates the necessity of high frequency electric focusing fields and thereby effects a substantial cost reduction in the auxiliary equipment necessary for operation.

It is a similar object of our invention to eliminate the necessity for magnetic fields for beam containment and thereby to effect a saving in the size and weight of auxiliary equipment.

Our invention concerns the application of electrostatic strong focusing techniques to multipolar electron beam tubes. In particular, the disclosed embodiments of our invention enable the substitution of transverse electrostatic fields in place of longitudinal magnetic fields or transverse alternating voltage induced fields to obtain focusing of the electron beam.

A salient feature of our invention as exemplified in one disclosed embodiment is a novel form of quadrupole electrode structure which makes it possible to achieve electrostatic strong focusing with direct current input voltages applied to the quadrupole structure. To this end, in one specific embodiment, the quadrupole structure is divided into a large plurality of incremental sections, each occupying successive planes preferably normal to the electron beam axis and with each successive segment being electrically distinct from the next adjacent segments. Direct current conductive in-leads are connected respectively to longitudinally successive segments of the quadrupole structure to permit successively opposite polarity direct current biasing of the successive segments so that each beam electron is subjected to alternate gradient focusing fields at an alternation frequency corresponding to the rate at which the beam electrons traverse the successive segments of the quadrupole structure.

Additional features and other objects of our invention will be apparent from the following description taken in accordance with the accompanying drawings, throughout which like reference characters indicate like parts, which drawings form a part of this application and in which:

FIGURE 1 is a perspective view of a quadrupole electrode assembly arranged to produce a periodic quadrupolar electric focusing field;

FIG. 2 is a schematic side view, partly broken away, of a discharged device in accordance with the present invention;

FIG. 3 is an enlarged perspective view of a portion of the input coupler section of the device shown in FIG. 2;

FIG. 7 is a cross section taken along the line 7—7 of FIG. 6;

Figure 6:
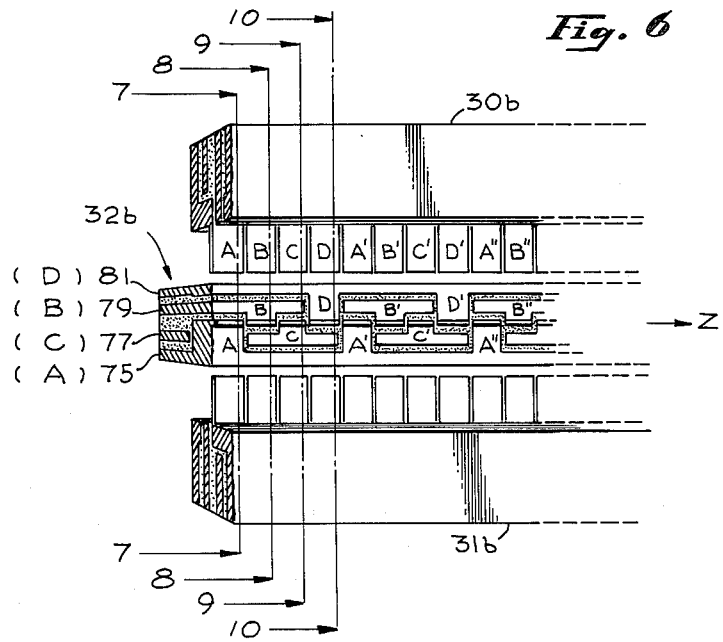
FIG. 6 is an enlarged fragmentary portion of the pump section (b) of the device shown in FIG. 2.
Figure 8:
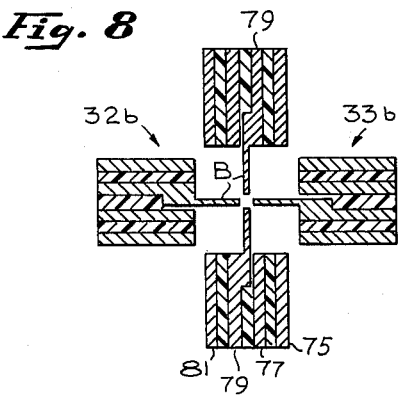
Figure 9:
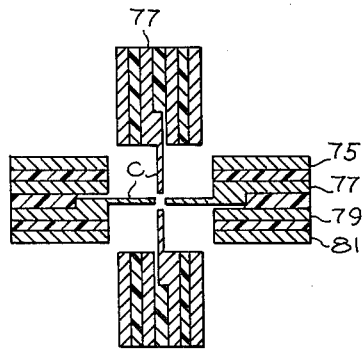
Figure 10:
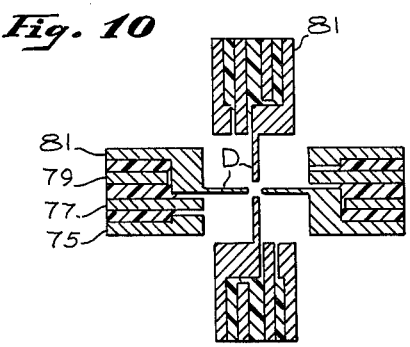

FIGS. 8 to 10, inclusive, are cross sections similar to FIG. 7, but taken along successively next adjacent groups of segments of the pumping section as indicated, respectively, by the line 8—8, the line 9—9, and the line 10—10 of FIG. 6; and FIG. 11 is a set of waveforms illustrating the electric fields to which a given electron is subjected during its traversal of the pumping section (b) of the apparatus shown in FIG. 2.

Because of the extensive mathematical analysis relevant to the present invention, an index of the definitions of important terminology appearing in the following discussion is presented here. Many of the following terms are also used repeatedly as subscripts.

$A$ = constant of integration;
$a_u, a_x, a_y$ = normalized parameter specifying the static quadrupole electric fields;
$B$ = constant of integration;
$C_{2n}, C_o$ = coefficients in the normalized solution of the Mathieu equations of motion;
$c$ = velocity of light;
$E$ = transverse electric fields (volts/meter);
$F$ = normalized transverse steering force;
$e/m$ = charge-to-mass ratio of the charged particles (coulombs/kilogram);
$exp$ = base of the natural system of logarithms (2.718 ...);
$i_b$ = beam current (amperes);
$L$ = length of a functional section (meters);
$n$ = an integer;
$P_{(a)}$ = power absorbed by the input coupler section (a) (watts);
$P_{(c)}$ = power supplied by the output coupler section (c) (watts);
$q, q_u, q_x, q_y$ = normalized parameter specifying the alternating quadrupole electric containment field;
$R_{(a)}, R_{(c)}$ = coupler section transverse beam resistance (ohms);
$r_o$ = one-half the electrode separation (meters);
$t$ = time, the independent variable (seconds);
$U(t)$ = particular solution in the $u$ direction as a function of time;
$u$ = either $x$ or $y$ coordinates (meters);
$V, V_1, V_2, V_\omega, V_{1x}$, etc. = signal voltage measured across input or output terminals (volts peak) at frequencies $\omega_1, \omega_x$, etc.;
$V_{ac}$ = alternating containment quadrupole voltage (volts peak);
$V_b$ = electron gun accelerating voltage (volts);
$V_{dc}$ = unidirectional quadrupole voltage (volts);
$V_{eff}$ = the effective confinement potential (volts);
$v_x, v_y, v_z$ = beam velocity (meters/second);
$X(z, t)$ = particular displacement in the $x$ direction as function $z$ and $t$ (meters);
$x$ = one of the independent transverse displacements of the beam (meters); (also used as a subscript indicating the $x$ component);
$y$ = the other independent displacement of the beam orthogonal to $x$ (meters); (also used as a subscript indicating the $y$ component);
$Z_b$ = longitudinal beam impedance = $V_b/i_b$ (ohms);
$z$ = displacement along the longitudinal axis of the system (meters); (also used as a subscript indicating the $z$ component);
$\Omega$ = angular frequency of the containing quadrupole strong focusing fields (radians/second);
$\xi$ = normalized time ($\xi = \Omega t/2$);
$\dot{x}$ = component in $x$ direction of velocity of a beam particle;
$\dot{y}$ = component in $y$ direction of velocity of a beam particle;
$\beta, \beta_u, \beta_x, \beta_y$ = normalized fundamental frequency of transverse motion of resiliently contained beam particles;
$\omega, \omega_\beta, \omega_x, \omega_y$, etc. = the resultant angular frequency of transverse oscillation ($\omega_u = \beta\Omega/2$) (radians/second);
$\psi$ = phase angle (radians);
$\phi$ = phase angle (radians);
$\nabla^2$ = the operator $\left(\nabla^2 = \dfrac{\partial^2}{\partial x^2} + \dfrac{\partial^2}{\partial y^2} + \dfrac{\partial^2}{\partial z^2}\right)$
$\gamma$ = coupling coefficient $\left(\gamma = \dfrac{E_1}{V_1}r_o\right)$ To clarify the basic concepts of strong focusing by means of transverse electric fields, there is shown in FIG. 1 a simplified quadrupole arrangement generally similar to the devices described in our above-mentioned application Serial No. 851,055. The quadrupole structure comprises four electrodes 15, 16, 17, and 18 of generally cylindrical shape, the electrodes being symmetrically arranged parallel to and at a distance $r_o$ from the $z$ axis which corresponds to the normal beam axis or beam direction. The upper and lower electrodes 15 and 16 normally are externally interconnected and have their axes lying in coincidence with the $x$–$z$ plane. The side electrodes 17 and 18 of the quadrupole structure are similarly interconnected and have their longitudinal axes aligned with the $y$–$z$ plane.

Very briefly, electric strong focusing is based upon the premise that stable or self-limiting transverse oscillation of beam electrons can be achieved by application of transverse electric fields if the effective frequency and intensity of such fields are properly related to the longitudinal velocity, the mass, and the elemental electric charge of the beam particles. Thus, if a time-varying voltage $V \sin \Omega t$ is applied between the electrodes 15 and 17, a time-varying electric field is created between the first common pair (15, 16) and the second common pair (17, 18). It may be seen that this field is zero at points along the $z$ axis and therefore will not affect electrons which lie directly on the $z$ axis. Electrons which are instantaneously located at a radial distance from the $z$ axis are subjected to an increased field as their distance from the $z$ axis increases. Thus, by simple physical argument it may be seen that when the applied alternating focusing potential is of one polarity, the beam electrons will be inwardly focused in the $x$ direction and defocused in the $y$ direction. When the focusing potential reverses, electrons subject thereto will be inwardly accelerated in the $y$ direction and will be somewhat defocused in the $x$ direction. The foregoing briefly indicates in a qualitative manner the principle of resilient beam focusing by means of alternating transverse electric fields. The validity of the foregoing can be fully recognized by considering the mathematical analysis of the two special cases of the Mathieu differential equations for transverse motion of beam electrons, as set forth at pages 14 to 16 of our above-mentioned application Serial No. 851,055.

The Mathieu differential equation in its general form is:

$$d^2x/d\xi^2 + (a - 2q \cos 2\xi)x = 0 \quad (I)$$

The constants $a$ and $q$ in Equation I are related to the structure of FIG. 1 by the transformation expressions:

$$|q| = q_x = -q_y = 4\frac{e}{m}\frac{V_{ac}}{r_o^2}\frac{1}{\Omega^2} \quad (II)$$

and $$|a| = a_x = -a_y = 8\frac{e}{m}\frac{V_{dc}}{r_o^2}\frac{1}{\Omega^2} \quad (III)$$

Equation II indicates that the numerical value of $|q|$ is a direct function of $V_{ac}$, the alternating voltage amplitude applied to the quadrupole structure, and is inversely related to $\Omega^2$, where $\Omega$ is the frequency in radians/second of said alternating voltage. Equation III shows that $|a|$ is likewise inversely related to $\Omega^2$ and is directly dependent upon $V_{dc}$, the unidirectional component of voltage applied to the quadrupole structure (if any).

The Mathieu equation may be solved by known theory (see N. W. McLauchlan, Theory and Applications of Mathieu Functions, Oxford Press, New York, 1947). The general solution of Equation I is:

$$x = Ae^{\mu\xi}\sum_{-\infty}^{+\infty} nC_n e^{+in\xi} + Be^{-\mu\xi}\sum_{-\infty}^{+\infty} nC_n e^{-in\xi} \quad (VI)$$

From Equation II it may be appreciated that two different solutions exist. If the characteristic exponent $\mu$, involving $a$ and $q$, is imaginary, the solution remains finite for all values of the exponent. If, on the other hand, the exponent $\mu$ is real, the oscillatory amplitude of beam particles within the quadrupole structure increases exponentially, and such beam particles are, in effect, progressively divergent and therefore unstable or progressively defocused.

For values of $a$ and $q$ within the first region of stability, the generation solution Equation IV takes the specific form:

$$U(\xi) = A \sum_{n=+\infty}^{n=+\infty} C_{2n} \cos (2n+\beta) + B \sum_{n=-\infty}^{n=+\infty} C_{2n} \sin (2n+\beta)\xi \quad (V)$$

when $n$ is an integer and the coefficients A and B are constants of integration determined by the initial conditions, namely $u(o)$ and $du(o)/d\xi$, and where $C_{2n}$ coefficients are functions of the $a$ and $q$ parametric values.

For values of $a_u \approx 0$ and $q_u < \frac{3}{4}$ (which define the preferred region of operation), these coefficients can be shown to be given by the following equation:

$$\frac{C_{2n}}{C_o} \sim \frac{q_u^n}{\frac{n}{\pi}(2n+\beta)^2} \quad (IV)$$

where $n \neq o$, for example:

$C_{-2}/C_o \approx q/(-2+\beta)^2$, $C_{-4}/C_o - q_u^2/(-2+\beta)^2(-4+\beta)^2$ etc.

According to Equations V and VI, the stable motion consists of an oscillation at the normalized angular subfrequency $\beta(0 < \beta < 1)$ upon which are superimposed other progressively smaller harmonic vibrations at normalized frequencies of $2-\beta$, $2+\beta$, $4-\beta$, etc. The fundamental or resultant frequency of motion $\beta$ is also a function of the $a_u$ and $q_u$ parametric values.

As set forth in detail in the above-mentioned copending application Serial No. 851,055, stability of the beam particle oscillation is determined by the values of $a$ and $q$ and is independent of the original particle orthogonal position $(x, y)$ and independent of the beam particle transverse velocity $(\dot{x}, \dot{y})$.

By a critical analysis of the above equations, as set forth in detail in our copending application Serial No. 851,055, it may be appreciated that an alternating containment voltage applied to the quadrupole structure of FIG. 1 will resiliently secure the electron beams within a cylindrical beam pathway coaxially surrounding the longitudinal $z$ axis and peripherally defined by the innermost surfaces of the quadrupole electrodes. During a half-cycle of the focusing voltage, each beam electron is subjected to an average force, directed toward the $z$ axis, which depends upon the distance of the particular electron from the $z$ axis. Thus, the beam containment effect may be likened to a spring function in that there is applied to each electron a radially inward force roughly analogous to the force which would be exerted by a tension spring extending from the $z$ axis to the electron and freely movable with the longitudinally moving electron along the $z$ axis.

The foregoing discussion is not explicitly applicable to the subject matter of the present invention. Rather, the foregoing is a review of the strong focusing concepts as set forth extensively in our above-mentioned copending application Serial No. 851,055 and utilized by the systems thereof. Additional electrical beam confinement theory is explained in detail in another copending application Serial No. 836,486, filed August 27, 1959, now Patent No. 3,065,640, and entitled "Containment Device." For the sake of brevity, the extended mathematical analyses which appear in the above-mentioned copending applications are not reiterated herein, but are intended to be incorporated by reference.

The following discussion is directed to the specific apparatus of the present invention and the manner in which it distinguishes from the foregoing.

Referring to FIG. 2, there is shown a charged particle beam vacuum tube, such as an electron beam tube, provided with a charged particle source such as an electron gun including a heated filament 21 and a focusing electrode 22, with a voltage source 24 connected to provide a unidirectional accelerating and focusing voltage to cause the electrons to flow from the heated filament 21 through the apertured focusing electrode 22, whereby a small diameter electron beam is formed and directed generally along the axis of symmetry 27 of the electron tube. The electron gun is enclosed within one end of a vacuum envelope 19, with an anode 23 provided at the opposite end of the envelope to finally collect the beam particles. Thus the electron beam is oriented to pass longitudinally through a quadrupole beam containment assembly which is disposed along the axis 27 between the accelerating electrode 22 and the anode 23. In the disclosed embodiment, the accelerating electrode 22 is connected to a point of reference potential 28 indicated as ground, and the accelerating voltage source 24, indicated schematically as a battery, has its positive terminal connected to the reference point 28 and has its negative terminal connected to the cathode 21. The anode 23 is shown as connected to the reference potential point 28. It is to be understood, however, that the anode 23 may be biased slightly positive with respect to the electron gun, if desired, to achieve complete absorption of the electron beam without secondary emission at the anode 23. In the present invention, it is preferable that the potential of anode 23 shall be low enough with respect to the accelerating anode 22 that the anode potential will have a negligible effect on the velocity of the beam electrons during their passage through the quadrupole electrode beam containment assembly. The focusing electrode 22 causes the electrons emitted from the filament 21 to enter the quadrupole system through a central aperture 26 which directs the electrons generally along the axis 27. The quadrupole beam containment assembly comprises a top electrode 30, a bottom electrode 31, and first and second side electrodes 32 and 33, respectively, which are shown partially broken away to enable illustration of the electron beam within the quadrupole assembly. In the embodiment shown in FIG. 2, each electrode, such as the top electrode 30, is divided into three longitudinal sections $(a)$, $(b)$, and $(c)$, respectively having effective lengths $L_1$, $L_p$, and $L_2$. The sections $(a)$, $(b)$, and $(c)$ are separated by insulating gaps 34, which may be thin inserts of insulating material which serve to electrically isolate each section from the next adjacent section so that the entire quadrupole assembly is divided into three electrically distinct, longitudinally successive sections. It is important that the sections $(a)$, $(b)$, and $(c)$ shall be electrically independent for alternating (particularly RF) voltages. In some embodiments, they may be interconnected for direct current, if desired, by means of radio frequency chokes, or the like. The first section $(a)$ of the quadrupole assembly is the signal input coupler section, as defined more completely hereinafter in connection with FIGS. 3, 4, and 5. The second section $(b)$ of the quadrupole assembly is a pumping or amplifying section, as described hereinafter in connection with FIGS. 6 to 10, inclusive. The third section $(c)$ is a signal detection means or signal output coupler, which may be structurally similar to the first section $(a)$ but which operates to absorb signal energy from the transversely oscillating beam particles.

Figure 4:
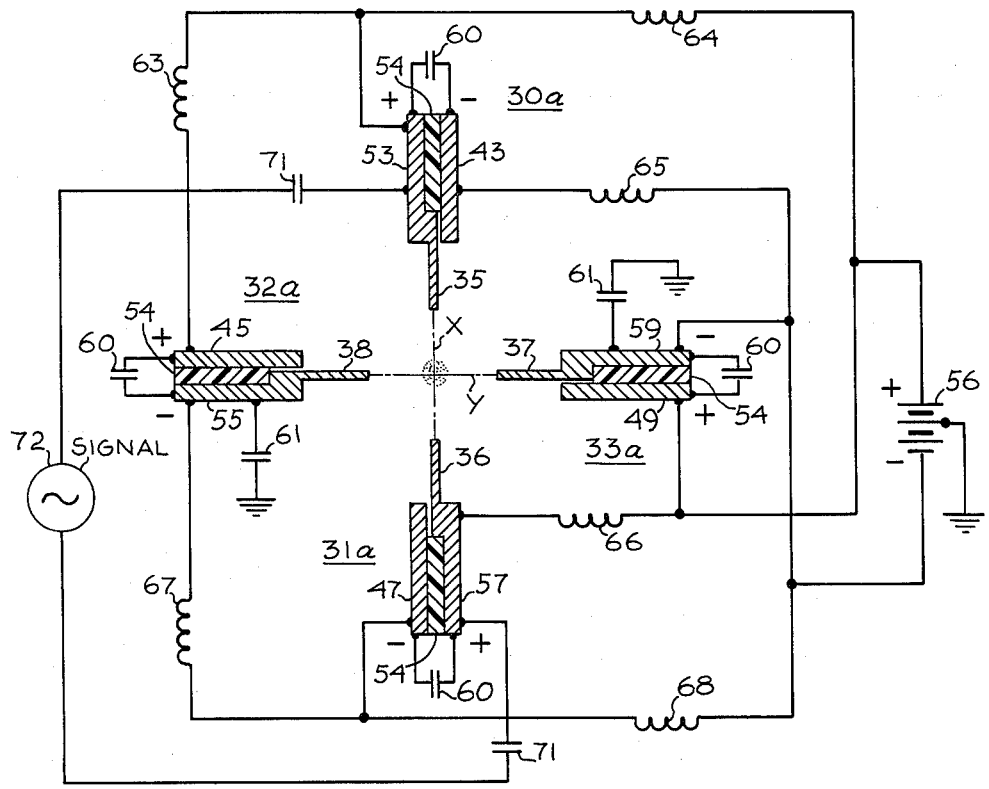
FIG. 4 is a cross-sectional view of the input coupling section taken along the line 4—4 of FIG. 2 and including in a simplified form the external electric circuit connections for properly energizing the input section.

As shown in FIGS. 2 and 4, the top electrode 30a of the input section $(a)$ consists of a pair of elongated conductive bus bar members 43 and 53 between which is sandwiched a layer of insulating material 54 to maintain the bus bars 43 and 53 electrically distinct. From the lower side of the electrode 30a a row of comb-like tooth portions extend toward the axis 27 and toward the electron beam. The tooth portions 35, 39, 35', and 39', etc., lie generally in the x–z plane with their free ends disposed adjacent the axis 27. The tooth 35 is conductively connected to the bus bar 53; the tooth 39 is conductively connected to the bus bar 43; the tooth 35' is connected to the bus bar 53 in common with the tooth 35; and the tooth 39' is conductively connected to the bus bar 43 in common with the tooth 39. Similarly, successive teeth along the entire length of the electrode 30a are alternately connected to the bus bars 53 and 43. As best shown in FIGS. 3 and 4, the arrangement just described enables direct current biasing of the teeth 35, 35' . . . to a positive potential $+V_o$ with respect to the reference potential 28 and enables direct current biasing of the alternate teeth 39, 39' . . . to a common negative potential $-V_o$ relative to the point of reference potential. It is to be understood that the lower electrode 31a is constructed identically as the top electrode 30a just described, and the side electrodes 32 and 33 of the input section are likewise identical to the top electrode 30a; that is the bottom electrode 31a consists of bus bars 47 and 57 with a layer of insulating material 54 sandwiched therebetween and with tooth portions 36, 36' . . . and interstitial tooth portions 40, 40' . . . extending upwardly from the bus bar 47.

Referring to FIG. 4, bus bar 53 of electrode 30a is connected through RF choke 64 to the positive terminal of a direct current biasing voltage source, shown schematically as a battery 56. The voltage source or battery 56 is schematically shown as being center tap grounded so that it provides a positive direct current biasing voltage at the top end and a negative biasing voltage at the bottom end. The negative end of battery 56 is connected through RF choke 68 to bus bar 47 of electrode 31a, through RF choke 67 to bus bar 55 of electrode 32a, by way of RF choke 65 to bus bar 43 of electrode 30a, and is directly connected to bus bar 59 of side electrode 33a. The positive terminal of battery 56 is direct current conductively connected by way of RF choke 64 to bus bar 53, through RF choke 63 to bus bar 45, through RF choke 66 to bus bar 57, and is directly connected to bus bar 49 of side electrode 33a. The side electrodes 32a and 33a are respectively grounded for alternating currents by means of by-pass capacitors 61. Bus bars 43 and 53 of top electrode 30a are connected together by the by-pass capacitor 60, and the corresponding bus bars of lower electrode 31a are connected together by a second by-pass capacitor 60. The upper and lower electrodes 30a and 31a are respectively coupled through coupling capacitors 71 to the terminals of an alternating current signal source 72 which provides input signal energization of the upper and lower electrodes in addition to the direct current focusing energization of the same. It is to be understood that, while the input signal coupling has been shown schematically as comprising capacitors 71, the input signal coupling may alternatively be accomplished by any of various arrangements which will become apparent to persons skilled in the art for coupling in an alternating signal voltage while prohibiting the flow of direct current from the battery 56 to the signal source 72. For example, we contemplate that the signal coupling means for applying signals from source 72 to the upper and lower electrodes might comprise one of various known coaxial high-frequency coupling devices or may be a waveguide structure within the purview of our invention.

The circuit arrangement just described provides alternate direct current biasing of successive teeth of each quadrupole electrode. Such biasing is indicated in FIG. 3, where the teeth 35 and 36 are shown as having a positive voltage $+V_o$, and teeth 37 and 38, being the side electrode teeth in the same longitudinal elemental segment of the structure, have a negative direct current potential $-V_o$. Thus, the longitudinal incremental portion, which includes the teeth 35, 36, 37, and 38, forms an electric field extending from tooth 35 to tooth 37 and extending from tooth 36 to tooth 38. In the diagonal plane which includes the z axis and is at 45° with respect to the x and y axes, the potential gradient is essentially zero at the z axis and increases linearly as the distance from the z axis. The electric field in a first incremental longitudinal portion of the input coupler section defined by the teeth 35 to 38 is substantially the same as the electric field which would exist in the quadrupole arrangement of FIG. 1 at the instant of time when the alternating voltage applied to the quadrupole of FIG. 1 is at a maximum. A second incremental portion of the input coupler section defined by the teeth 39, 40, 41, and 42 is biased oppositely from the first incremental portion and produces an electric field identical to that which would be produced by the quadrupole arrangement of FIG. 1 at a time one half-cycle later. Thus, for an electron moving generally parallel to the z axis in FIG. 3, the effective electric field is in one direction when the electron is in the vicinity of teeth 35 to 38, and the electric field is reversed when the given electron reaches the vicinity of teeth 39 to 42. As a given electron progresses longitudinally along the toothed structure of the input coupler, the electron is subjected to alternate electric fields which, so far as the electron is concerned, are substantially identical to the alternating voltage induced fields in the quadrupole arrangement of FIG. 1. Accordingly, it is clear that the basic equations for quadrupole amplifiers, as set forth in our copending application Serial No. 851,055, will hold true for the structure shown in FIG. 2.

It is evident that spatial modulation of the quadrupole fields by means of the successively alternately biased incremental portions of the input coupler will be just as effective as time modulation of a quadrupole structure like that of FIG. 1 for providing alternate gradient focusing of the beam electrons. The structure as described with reference to FIGS. 3 and 4 has the advantage that quadrupole containment is accomplished by means of voltages from the direct current source 56, and there is no need for a source of RF voltage or power for the quadrupole focusing electrodes. Thus is in contrast to the quadrupole structures of our copending application Serial No. 851,055, wherein the containment frequency $\Omega/2\pi$ must be at a higher frequency than that at which the amplifier is to operate, and typically about four times the frequency of the input signal. Thus the beam containment structure of the present invention can operate at much higher frequencies because the only radio frequency voltages involved are the input signal voltage from source 72 and the output signal which may be derived from output coupler section (c).

Figure 5:
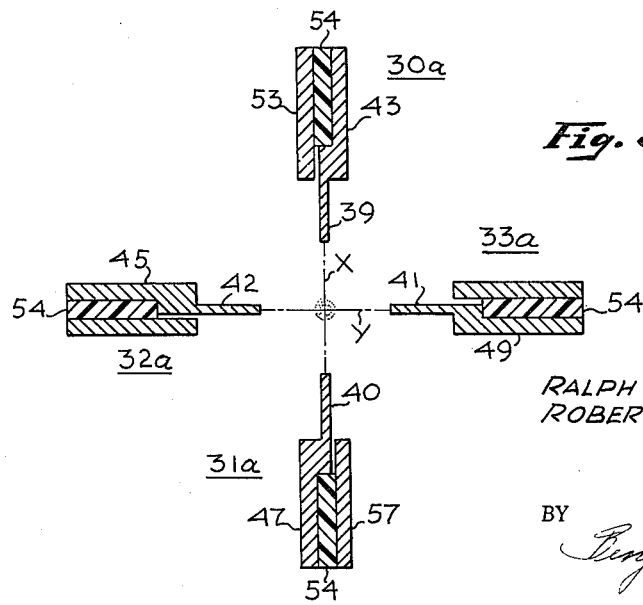
FIG. 5 is a cross-sectional view similar to FIG. 4, but taken along the line 5—5 of FIG. 2.

FIG. 5 is a cross section taken along the line 5—5 of FIG. 2, further illustrating the manner in which the teeth 39, 40, 41, and 42 are respectively connected to the bus bars 43, 47, 49, and 45. Since FIG. 5 is a cross section of the same set of bus bars as are shown in FIG. 4, it will be clear that all the circuit connections shown in FIG. 4 hold for the elements shown in FIG. 5, and therefore the active teeth in FIG. 5 are biased by the same voltage as the inactive bus bars 43, 45, 47, and 49 as shown in FIG. 4. Thus, the electric fields applied to the beam particles which are in the plane of FIG. 5 are just the reverse of the fields applied to the particles in the plane of FIG. 4. As an electron progresses from the plane of FIG. 4 to the plane of FIG. 5, it experiences an electric field reversal substantially identical to that which would transpire during a half-cycle of the containment voltage applied to the quadrupole structure in FIG. 1.

For an improved understanding of the amplifying section (b) of FIG. 2, there is shown in FIG. 6 an enlarged fragmentary view of a portion of the pumping quadrupole assembly 30b to 33b of FIG. 2. As shown in FIG. 6, the top electrode 30b and the bottom electrode 31b are provided with longitudinally successive comb-like teeth generally similar to the teeth of the electrodes in the input coupler section, but differing specifically as discussed hereinafter. The structure of the quadrupole electrodes of the pumping section differs from the structure of the same elements of the input section as shown in FIG. 7. Instead of having a pair of bus bars with an intermediate insulating strip, the pump section upper electrode 30b, for example, comprises four parallel bus bar members 75, 77, 79, and 81 which are sandwiched together with insulating material disposed between adjacent bus bars to provide a generally rectangular, longitudinally extending bus bar assembly 30b in which the individual bus bars are electrically distinct and therefore may be independently biased. As shown in FIG. 7, the tooth A of bus bar assembly 30b is conductively connected to the individual bus bar 75. The next adjacent tooth B, as shown in FIG. 6, is conductively connected to the bus bar 79. The third tooth C is connected to the bus bar 77, and the fourth successive tooth D is connected conductively to the bus bar 81, as shown in FIG. 10. The pattern repeats in the same manner, with the fifth tooth A′ being connected commonly with tooth A to bus bar 75, tooth B′ connected commonly with tooth B to bus bar 79, etc. As shown in FIG. 7, bus bar 75 is positively biased to +25.5 volts by connection to a positive voltage source 83; bus bar 77 is biased to +24.5 volts by connection to a source 85; bus bar 81 is negatively biased to −25.5 volts by connection to a source 86; and bus bar 79 is negatively biased to −24.5 volts by connection to a voltage source 89. Source 87 provides a maximum negative voltage on bus bar 81 and therefore a maximum negative voltage on teeth D, D′, etc. Source 83 provides a maximum positive voltage on bus bar 75 and therefore a maximum positive bias on teeth A, A′, etc. Similarly, source 85 provides a lesser positive bias on the "C" teeth and source 89 provides a lesser negative bias on the "B" teeth.

It will be understood that the other pump section electrodes 31b, 32b, and 33b are constructed in a manner similar to that just described and are similarly biased by four voltage sources providing two different positive biasing voltages and two different negative biasing voltages. Such biasing of electrodes 31b and 32b is illustrated schematically in FIG. 7.

In the foregoing embodiment, the input section electrodes 30a to 33a have been described as each comprising a pair of elongated bus bar members, while the pump section electrodes 30b to 33b are each disclosed as being formed of four sandwiched elongated bus bars, such as elements 43, 47, 49, and 45. For manufacturing economy reasons, we contemplate that the input and output sections (a) and (b) may alternatively utilize electrode assemblies identical structurally to that of the pump section but with appropriate pairs of the four bus bars being electrically shorted so that each electrode assembly is electrically and operatively equivalent to the heretofore described input section, as illustrated by FIGS. 4 and 5.

Moreover, while we presently prefer the amplifying section structure (b) as illustrated in FIGS. 6 to 10, inclusive, for supplying a unidirectional voltage "pumping" field, we recognize that, alternatively, pumping fields may be supplied by using an octupole structure generally similar to that described in our above-mentioned patent application Serial No. 851,055. Such an octupole structure for use in accordance with the present invention would, of course, comprise symmetrically arranged electrode structures of the type illustrated by FIGS. 2, 4, and 5 rather than the solid cylindrical bars embodied in the apparatus of our above-mentioned application.

The structures just described with the biasing potentials mentioned provide longitudinally successive alternate voltage gradients along the pump section in accordance with the voltage waveforms shown in FIG. 11. By consideration of FIG. 11, it will be appreciated that a given electron traveling generally along the pump section will be resiliently contained within the predetermined desired beam pathway, and the signal existing on the electron beam will be pumped or amplified in much the same manner as amplification is accomplished by the amplifying section of the quadrupole structure shown in our copending application Serial No. 851,055.

In the amplifying section structure described heretofore, the pumping field to which the electrons are subjected has an effective frequency which, because of structural requirements, is exactly half the effective frequency of the focusing fields. The theory delineated in our above-mentioned copending application Serial No. 851,055 requires that the pumping "frequency" shall be twice the input signal frequency. Therefore, in devices according to the present invention:

$$\Omega = \frac{2\omega}{v/c} = 4\omega$$

and $$v/c = \tfrac{1}{2}$$

That is, practical configurations for the amplifying section electrodes dictate that a value $v/c = \tfrac{1}{2}$ shall be used.

From Equations 9 and 10 of our above-mentioned application Serial No. 851,055 we know that the fundamental frequency of transverse motion of the beam electrons $v/c$ is necessarily a function of $a_u$ and $q_u$. Therefore, to obtain a value of ½ for $v/c$, and assuming that $a_u$ is substantially zero:

$$v/c = 1/2 = \sqrt{a_u + \frac{q_u^2}{2}}$$

$$\frac{q_u}{\sqrt{2}} = 1/2$$

$$q_u = \frac{\sqrt{2}}{2} = 0.707$$

If the input coupler length is $L_1$ and $\lambda f = c$, then the number $n$ of complete oscillations within the input section 30a is:

$$n = \frac{L_1 f}{v} = \frac{L_1 c}{\lambda v} = \frac{L_1}{v/c\lambda}$$

Considering FIGS. 3 and 11, it is apparent that the longitudinal dimension of an input coupler tooth must be equal to the distance traversed by an electron during one-half the period of the focusing voltage "effective frequency." Therefore, the tooth dimensions is:

$$b = \frac{1}{2} \cdot \frac{1}{n} \cdot \frac{1}{4} = \frac{1}{8n}$$

$1/n$ appears in the above because, by the definition of $n$, $1/n$ is the distance traveled by a beam electron during one complete input signal oscillation. The ¼ factor arises from the required ratio $\omega/\Omega = \tfrac{1}{4}$. That is:

$$b = \frac{1}{2} T v = \frac{1}{2} \frac{2\pi}{\Omega} v$$

$$= \frac{1}{2} \cdot \frac{2\pi}{4\omega} v$$

$$= \frac{1}{2} \cdot \frac{T_s}{4} v$$

But: the distance traveled by a beam electron during one input signal oscillation is $T_s v = 1/n$. Therefore:

$$b = \frac{1}{2} \cdot \frac{T_s v}{4}$$

$$= \frac{1}{8} T_s v = \frac{1}{8} \frac{1}{n}$$

$$= \frac{1}{8n}$$

Assuming that $n=5$ is a sufficient number of oscillations to give satisfactory input coupling, then:

$$5 = \frac{1}{v/c\lambda}$$

$$b = \frac{1}{40}$$

Combining:

$$5v/c = 40a$$

$$b = \frac{v\lambda}{8c}$$

the value of $v/c$ can be calculated classically by conservation of energy: the energy imparted to the particle from the accelerating source equals the kinetic energy of the particle. Thus:

$$QV_b = \tfrac{1}{2}mv^2$$

Therefore:

$$\frac{e}{m}V_b 1\tfrac{1}{2}mv^2$$

$$v = \sqrt{\frac{2eV_b}{m}}$$

and $$\frac{v}{c} = \sqrt{\frac{2eV_b}{mc^2}} = 2 \cdot 10^{-3}\sqrt{V_b} \qquad (VII)$$

Considering the functions of quadrupole electrode teeth 35, 35', ..., as shown in FIG. 3, it has thus far been assumed that the electron velocity component in the $z$ direction remains constant. In alternating voltage energized quadrupole devices, such as those of our copending application Serial No. 851,055, that assumption is sufficiently correct. However, the unidirectional voltage energized quadrupole devices of the present invention inherently provide an electric field in the $z$ direction between longitudinally adjacent teeth.

In a device having optimum parameters, these $z$-direction electric fields average out and do not seriously affect the operation of the quadrupole device. The following is a consideration of factors involved in choosing the optimum dimensional parameters for a practical toothed-electrode type of quadrupole amplifier.

First, assume that electron velocity in the $z$ direction remains constant. With that assumption, the electron trajectories obey the Mathieu equations:

$$\frac{d^2y}{d\xi^2} - 2q(\sin 2\xi)y = 0 \qquad (VIII)$$

$$\frac{d^2x}{d\xi^2} + 2q(\sin 2\xi)x = 0 \qquad (IX)$$

where:

$$q = \frac{\gamma}{\pi^2}\left(\frac{b}{r_o}\right)^2\left(\frac{2V_o}{V_b}\right) \qquad (X)$$

$$eV_b = \tfrac{1}{2}m\dot{z}^2 \qquad (XI)$$

$$\xi = \frac{\pi z}{2b} \qquad (XII)$$

By considering the equation for energy conservation for a particle moving in the $y$–$z$ plane (FIG. 3), it can be shown that the foregoing assumption is not rigorously true for the apparatus of the present invention; i.e., $$eV_b = \tfrac{1}{2}m(\dot{y}^2 + \dot{z}^2) + eV(o, y, z) \qquad (XIII)$$

For the structure of FIG. 3, the potential at any selected point is approximately:

$$V = -\gamma V_o \frac{x^2 - y^2}{r_o^2} \sin\frac{\pi z}{b} \qquad (XIV)$$

Therefore, Equation XIII can be rewritten as follows:

$$eV_b = \tfrac{1}{2}m(\dot{y}^2 + \dot{z}^2) - eV_o\frac{\gamma(x^2 - y^2)}{r_o^2}\sin\frac{\pi z}{b} \qquad (XV)$$

The beam particle presently under consideration is moving only in the $y$–$z$ plane of FIG. 3, and therefore the $x$ displacement is always zero. Hence:

$$eV_b = \tfrac{1}{2}m(\dot{y}^2 + \dot{z}^2) + eV_o\gamma\left(\frac{y}{r_o}\right)^2\sin\frac{\pi z}{b}$$

From Equation X above we have:

$$\gamma = \frac{q\pi^2 r_o^2 V_b}{2b^2 V_o} = \frac{q\pi^2}{2}\left(\frac{r_o}{b}\right)^2\frac{V_b}{V_o}$$

Substituting that expression in Equation XIV:

$$eV_b = \tfrac{1}{2}m(\dot{y}^2 + \dot{z}^2) + eV_o\frac{q\pi^2}{2}\frac{r_o^2}{b^2}\frac{V_b}{V_o}\frac{y^2}{r_o^2}\sin\frac{\pi z}{b}$$

$$eV_b = \tfrac{1}{2}m(\dot{y}^2 + \dot{z}^2) + eV_b\frac{q\pi^2}{2}\left(\frac{y}{b}\right)^2\sin\frac{\pi z}{b}$$

or $$\tfrac{1}{2}m(\dot{y}^2 + \dot{z}^2) = eV_b - eV_b\frac{q\pi^2}{2}\left(\frac{y}{b}\right)^2\sin\frac{\pi z}{b}$$

$$\frac{\tfrac{1}{2}m(\dot{z}^2 + \dot{y}^2)}{eV_b} = 1 - \frac{q\pi^2}{2}\left(\frac{y}{b}\right)^2\sin\frac{\pi z}{b}$$

$$\frac{\tfrac{1}{2}m}{eV_b} = \frac{1 - \frac{q\pi^2}{2}\left(\frac{y}{b}\right)^2\sin\frac{\pi z}{b}}{\dot{y}^2 + \dot{z}^2}$$

$$\frac{\tfrac{1}{2}m\dot{z}^2}{eV_b} = \frac{1 - \frac{q\pi^2}{2}\left(\frac{y}{b}\right)^2\sin\frac{\pi z}{b}}{\frac{1}{\dot{z}^2}(\dot{y}^2 + \dot{z}^2)}$$

$$\frac{\tfrac{1}{2}m\dot{z}^2}{eV_b} = \frac{1 - \frac{q\pi^2}{2}\left(\frac{y}{b}\right)^2\sin\frac{\pi z}{b}}{\frac{\dot{y}^2}{\dot{z}^2} + 1} = \frac{1 - \frac{q\pi^2}{2}\left(\frac{y}{b}\right)^2\sin\frac{\pi z}{b}}{1 + \left(\frac{dy}{dz}\right)^2}$$

$$\frac{\tfrac{1}{2}m\dot{z}^2}{eV_b} = \frac{1 - \frac{q}{2}\pi^2\left(\frac{y}{b}\right)^2\sin\frac{\pi z}{b}}{1 + \left(\frac{dy}{dz}\right)^2} \qquad (XVI)$$

For a value of $q = \tfrac{2}{3}$, the above Equation XVI becomes:

$$\frac{\tfrac{1}{2}m\dot{z}^2}{eV_b} = \frac{1 - \frac{\pi^2}{3}\left(\frac{y}{b}\right)^2\sin\frac{\pi z}{b}}{1 + \left(\frac{dy}{dz}\right)^2} \qquad (XVII)$$

By inspection of Equation XVII it may be observed that for an assumed $y/b = \sqrt{3/\pi} = 0.55$ and for $z/b = \tfrac{1}{2}$, the longitudinal component of electron velocity will vanish.

Thus, it is clear that if $y/b$ can be on the order of unity, it must not be assumed that the $z$-direction electron velocity remains constant.

The correct equation of motion of a particle in the $y$–$z$ plane is given by:

$$\frac{d^2y}{d\xi} - 2q(\sin \xi)y = 0 \qquad (XVIII)$$

wherein:

$$q = q_0\left[\frac{1 + \left(\frac{dy}{dz}\right)^2}{1 - \frac{q_0}{2}\pi^2\left(\frac{y}{b}\right)^2\sin 2\xi}\right]$$

and where $q_0$ is given by Equation X. If the term in brackets, [ ], were unity, this would reduce to the usual Mathieu equation. As it stands, it is a nonlinear equation, and the natural frequency $\omega$, corresponding to the "wavelength" of the trajectory ($\omega=2\pi\dot{z}/\lambda$), would vary with the average amplitude $\bar{y}$. Clearly, if $y/b$ is small enough, this objectionable feature will vanish, and Equation VIII will be satisfied.

The input coupler requirement is that the natural frequency of the electron remain within ¼ of a cycle of the input frequency $\omega_0$ for five periods; therefore:

$$\frac{\Delta\omega}{\omega} \leq \frac{1}{5 \times 4} = 5 \times 10^{-2}$$

It can be shown that $\beta$ increases substantially linearly as a function of $q$ for values of $q$ up to approximately 0.5. Beyond that value $\beta$ increases more or less as a second order function of $q$.

The input signal frequency $\omega$ is a function of $\beta$, i.e., $$\omega = \beta\frac{\Omega}{2} = \beta\frac{\pi\dot{z}}{2b}$$

When $q=\tfrac{2}{3}$ and $\beta=\tfrac{1}{2}$, $dq=1$, and therefore:

$$\frac{\Delta q}{q} = \frac{\beta}{q} \cdot \frac{\Delta\beta}{\beta}$$

$$= \frac{\tfrac{1}{2}}{\tfrac{2}{3}} \cdot \frac{\Delta\omega}{\omega} \leq \tfrac{3}{4} \cdot 5 \cdot 10^{-2}$$

Thus:

$$\frac{\Delta q}{q} = 3.8 \cdot 10^{-2} \tag{XIX}$$

Substituting Equation XIX into Equation XVIII gives the approximate maximum desirable value of $y/b$:

$$\frac{(q=\tfrac{2}{3})}{2}\pi^2\left(\frac{y}{b}\right)^2 \sin 2\xi = \frac{\Delta q}{q} \leq 3.8 \cdot 10^{-2}$$

and hence:

$$\frac{y}{b} \leq 0.18$$

The above maximum value of $y$ should be considered as a maximum for the average value of $y$ over the distance $\lambda/2$. We have determined that an electron entering the quadrupole structure parallel to the $z$ axis has an average $y$ displacement of about twice the displacement at entrance. This means that the electron beam radius must be approximately one-half the maximum average value of $y$; that is: the beam radius, $y_0=\tfrac{1}{2}y$, and $$\frac{y_0}{b} \leq \tfrac{1}{2} \cdot 0.18 = 0.09 \tag{XX}$$

Equation XX, above, expresses the electron beam radius in terms of the quadrupole structure tooth lengths. It is difficult to form a beam of less than about .010 inch without using axial magnetic fields. Accordingly, we prefer to make $y/b$ small by making the ratio $r_0/b$ much smaller than unity. Starting with the requirement that $y/b \leq 0.18$ or $r_0/b \leq 0.18$ for all values of $y$, $r_0$ is chosen to be equal to the beam radius of commercially available electrostatically focused cathode ray guns. For example, the RCA tube designated IEPI is a "one-inch" CRT which produces a spot size about 10-20 mils in diameter.

The following is an example of one set of physical parameters which we have used: $r_0$ is chosen as .030 inch. Then, $$\frac{r_0}{b} = 0.18$$

$$b = \frac{.030}{0.18} = 0.167''$$

The input coupler requires a minimum of five input signal periods; therefore:

$$L_1 = 40 \times (b+g)$$

The interdental insulating gaps between longitudinally successive teeth should be at least about .003″. Accordingly, $$L_1 = 40 \times (0.167 + .003) = 6.8''$$

Thus, the input coupler section has an overall length of about seven inches. The pumping section and output section structures preferably are similar to the input section, so the overall length of the quadrupole structures of FIG. 2 is about 21 inches.

One further feature of our preferred quadrupole structure is worthy of note. If a structure as shown in simplified diagrammatic form in FIG. 3 were to be used, the electrons, upon entering the region of the first sector or first set of teeth, would receive an undesirably large "kick" or initial deflection. We have determined that, if the particles are injected at an effective "phase" differing from that by 90 electrical degrees, the transverse oscillations can be less pronounced without detracting from the signal translation and amplification capability. Since each longitudinal tooth length is, in effect, one half-cycle of the strong focusing "frequency," the injection "phase" is determined solely by the structure geometry.

We accomplish the desired 90 degree "phase" displacement by providing a first sector of four teeth at the input end of the input coupler which are just one-half the length of the standard teeth. Similarly, the initial and final longitudinal segments of the pumping and output sections are constructed of teeth having lengths of $b/2$. The 39 teeth intervening between the first and last teeth should, of course, be length $b$.

While we do not intend to limit our invention to any specific structural dimensions or parameters, the following values are given as illustrative of one embodiment of our invention in accordance with the arrangement of FIGS. 2 and 6 to 10, inclusive:

Tooth length "$b$" _____ 0.178″.
Beam containment aperture radius $r_0$ .031″.
Interdental insulating space $g$ _____ .0088″.
Input coupler length $L_1$ _____ 7.15″.
Electron gun _____ RCA Type IEPI.
Gun accelerating voltage $V_b$ _____ 1000 volts.
Input signal frequency _____ 550 mc.

A few advantages of the apparatus of our invention as compared with prior known devices, such as the alternating voltage energized quadrupole device of our copending application Serial No. 851,055, are the following:

(1) RF need be handled only in the input and output circuits (as is true of any amplifier or oscillator). All other potentials required are D.C. potentials.

(2) No multipacting will occur, as the only large voltages are D.C. voltages. The signal levels at input and output will not be large enough to cause multipacting.

(3) Signal power can be introduced and removed by the octupole arrangements, permitting the signal electrodes to be much nearer the beam than the focusing electrodes, thereby giving high $\gamma$. Conversely, the signal can be introduced on the D.C. electrode system if the various elements are properly by-passed for RF.

(4) No "beats" will take place in the D.C. amplification system between twice the signal and the pump frequency, as there is no pump frequency to beat with. Operation with pump frequency exactly twice the signal frequency is permitted here, whereas for this to occur with the A.C. quadrupole amplifier, the phase relation between the pump and signal must be fixed. Hence, in the A.C. quadrupole, amplifier, the phase relation between signal and pump continually changes (slowly) giving beats. This does not occur in the presently disclosed invention.

While there have been described what are at present considered to be preferred embodiments of the invention, it will be obvious to those skilled in the art that various changes and modifications may be made therein without departing from the invention, and it is aimed in the appended claims to cover all such changes and modifications as fall within the true spirit and scope of the invention.

The embodiments of the invention in which an exclusive property or privilege is claimed are defined as follows:

1. An electron beam amplifying tube comprising:
   an electron gun for providing a relatively low velocity beam of electrons directed along the longitudinal axis of the tube;
   an anode receptive of said beam;
   containment means including a plurality of electrode assemblies centered around the axis for providing two-dimensional transverse containment of said beam between said gun and said anode, with each of said assemblies comprising a plurality of longitudinally aligned and electrically distinct conductive elements;
   electrostatic focusing circuit means for energizing said containment means with a unidirectional voltage dependent upon the transverse spacing of said containment means so that said beam is bound to the axis by alternate gradient focusing;
   electric circuit means for impressing input signals on a first section of the length of said containment means to impart transverse oscillations to said electrons;
   electrostatic amplifying circuit means for impressing an amplifying unidirectional voltage in another section of the length of said containment means to increase any lateral deflection of said beam as a function of said transverse oscillations; and
   means for detecting the character of said increased lateral deflection.

2. An electron beam tube comprising:
   an electron gun for providing a beam of electrons directed along the longitudinal axis of the tube;
   an anode receptive of the beam;
   longitudinal containment means including a plurality of electrode assemblies for providing two-dimensional transverse containment of said beam about the axis between said gun and said anode, with each of said assemblies including a plurality of longitudinally aligned tooth-like conductive elements interdentally separated by insulating means;
   electrostatic focusing circuit means for energizing said containment means at a unidirectional voltage dependent upon the charge-to-mass ratio of the electrons and the transverse spacing of said electrode assemblies so that said beam is bound to the axis by an alternate gradient focusing containment field;
   circuit means connected to apply an input signal electrodynamic field to a first section of the length of said containment means to impart relatively small transverse oscillations to said beam;
   electrostatic amplifying circuit means connected to impress an amplifying electric field in a second section of the length of said containment means to increase the transverse oscillations of said beam as a function of said relatively small transverse oscillations; and
   an electric circuit means connected to a third section of said length for detecting the character of said increased transverse oscillations.

References Cited by the Examiner

UNITED STATES PATENTS

| | | | |
|---|---|---|---|
| 2,919,381 | 12/1959 | Glaser | 250—49.5 |
| 2,986,672 | 5/1961 | Vaccaro et al. | 315—5.34 |
| 3,148,302 | 9/1964 | Clavier et al. | 330—4.7 |

FOREIGN PATENTS 876,836  9/1961  Great Britain.

OTHER REFERENCES

E. I. Gordon: "A Transverse-Field Travelling Wave Tube," page 1158, Proc. I.R.E. for June 1960.

Gould et al.: "Coupled Mode Theory of Electron-Beam Parametric Amplification," pages 248–258 (page 251 relied on). Journal of Applied Physics for February 1961.

B. J. Udelson: "An Electrostatically Focussed Electron Beam Parametric Amplifier," pages 1485 and 1486, Proc. I.R.E. for August 1960.

ROY LAKE, *Primary Examiner.*

GEORGE WESTBY, *Examiner.*

C. O. GARDINER, D. HOSTETTER,
*Assistant Examiners.*